(12) United States Patent
Tamura et al.

(10) Patent No.: US 7,926,755 B2
(45) Date of Patent: Apr. 19, 2011

(54) BIOMASS MILL

(75) Inventors: Masato Tamura, Tokyo-to (JP); Ryunosuke Itokazu, Tokyo-to (JP)

(73) Assignee: IHI Corporation, Tokyo-to (JP)

( * ) Notice: Subject to any disclaimer, the term of this patent is extended or adjusted under 35 U.S.C. 154(b) by 0 days.

(21) Appl. No.: 12/590,702

(22) Filed: Nov. 12, 2009

(65) Prior Publication Data

US 2010/0123033 A1      May 20, 2010

(30) Foreign Application Priority Data

Nov. 17, 2008   (JP) .................... 2008-293770

(51) Int. Cl.
*B02C 15/00* (2006.01)
(52) U.S. Cl. ...................................... 241/121
(58) Field of Classification Search .............. 241/119, 241/121
See application file for complete search history.

(56) References Cited

U.S. PATENT DOCUMENTS

| | | | |
|---|---|---|---|
| 4,004,740 A | 1/1977 | Heinemann et al. | |
| 4,606,506 A | 8/1986 | Okada et al. | |
| 4,953,793 A | 9/1990 | Kiefer et al. | |

FOREIGN PATENT DOCUMENTS

| | | | |
|---|---|---|---|
| EP | 0409498 | * | 1/1991 |
| JP | 11-207200 | | 8/1999 |
| JP | 2005-113125 | | 4/2005 |
| WO | 01/56699 A1 | | 8/2001 |

OTHER PUBLICATIONS

European communication dated Jun. 7, 2010 in co-pending foreign application (EP09013941.1).

* cited by examiner

*Primary Examiner* — Mark Rosenbaum
(74) *Attorney, Agent, or Firm* — Nields, Lemack & Frame, LLC

(57) ABSTRACT

The invention provides a biomass mill, comprising a rotatable pulverizing table 5, a recessed groove 6 which is provided in form of ring on an upper surface of the pulverizing table and has an arcuate cross-section, a pressure roller 9 pressed into the recessed groove, a blowout hole 16 for blowing out the air from around the pulverizing table, and a chute 18 for supplying a wooden biomass toward a center of the pulverizing table, wherein the wooden biomass is supplied via the chute, the wooden biomass is pulverized between the pulverizing table and the pressure roller, and the pulverized wooden biomass is carried by blowing the air through the blowout hole, wherein a surface from an outer peripheral of the recessed groove to the blowout hole is flat surface.

7 Claims, 4 Drawing Sheets

FIG. 3

| FORM OF WOOD | PRIOR ART | THE PRESENT INVENTION | PRIOR ART | THE PRESENT INVENTION |
|---|---|---|---|---|
| | WOODEN CHIPS | WOODEN CHIPS | WOODEN PELLETS | WOODEN PELLETS |
| COAL SUPPLY QUANTITY | 200kg/h | 300kg/h | 400kg/h | 500kg/h |
| AIR QUANTITY IN MILL | 3000kg/h | | | |
| HYDRAULIC PRESSURE IN ROLLER | 3.5MPa | | | |
| ROTATIONAL SPEED OF TABLE | 42rpm | | | |
| MOTOR POWER OF MILL | 25kW | 22kW | 23kW | 25kW |
| DIFFERENTIAL PRESSURE IN MILL | 172mmAq | 227mmAq | 151mmAq | 163mmAq |

BIOMASS MILL

BACKGROUND OF THE INVENTION

The present invention relates to a biomass mill for pulverizing a wooden (ligneous) biomass such as wooden chips, wooden pallets, etc. to be used as a fuel for boilers.

In the boilers currently in operation, a coal is primarily used as a solid fuel. For the purpose of reducing discharge of $CO_2$, it is now studied and attempted to use a wooden biomass as a type of fuel, which has little burden on the environment.

When the wooden biomass is used as the fuel for boilers, the wooden biomass such as wooden chips, wooden pellets, etc. must be pulverized so that the wooden biomass will be combustible by burners.

When the wooden biomass is mixed in coal and is used as fuel, and if a mixing quantity of the wooden biomass is not much, it can be mixed and pulverized by using an existing type of coal mill. However, if the quantity of the wooden biomass used is increased, it is necessary to pulverize the wooden biomass by itself.

When a device for pulverizing the wooden biomass is manufactured, if it is designed as the device for pulverizing based on a coal roller mill for pulverizing coal, it would be possible to manufacture the device at low cost without extensively improving and without substantially changing manufacturing facility.

First, referring to FIG. 4, description will be given on a vertical mill 1 for pulverizing coal.

A closed space is formed by a casing 3, which is erected on a base 2, and a pulverizing table 5 is mounted in a lower portion of the space via a table drive unit 4. The pulverizing table 5 is rotated at constant speed by the table drive unit 4. On an upper surface of the pulverizing table 5, a table segment 7 is provided, which has a recessed groove 6 with a cross-section in arcuate form.

The necessary sets, e.g. 3 sets, of pressure roller units 8 are arranged in radial direction from a rotation center of the pulverizing table 5. The pressure roller unit 8 has a pressure roller 9, which can be tilted freely with a horizontal support shaft 11 as a center. In a lower portion of the casing 3, 3 sets of roller pressure devices 12 are disposed so that the roller pressure devices penetrate the casing 3 in radial direction. Each pressure roller 9 is pressed into the recessed groove 6 by the roller pressure device 12.

Under the pulverizing table 5, a primary air chamber 13 is provided. Above the pulverizing table 5 inside the casing 3, a classifier chamber 14 is arranged.

In the lower portion of the casing 3, a primary air supply port 15 is mounted, and the primary air supply port 15 is communicated with the primary air chamber 13. Around the pulverizing table 5, a gap is formed, and the gap fulfills a function as a primary air blowout hole 16.

In an upper part of the casing 3, a coal supply and discharge unit 17 is disposed. A chute 18 in form of pipe is provided so that the chute 18 penetrates a central portion of the coal supply and discharge unit 17, and the chute 18 is extended to inner space of the casing 3. The coal is supplied to the chute 18, and the supplied coal is to fall down to the pulverizing table 5.

A classifier 19 is rotatably mounted at the middle of the chute 18. The classifier 19 has a strip-type blade 21, which is disposed with a predetermined pitch in circumferential direction, and the classifier 19 is rotated by a rotary drive unit 22.

A pulverized coal feeding pipe 23 for feeding the pulverized coal to the boiler burner is connected to the coal supply and discharge unit 17.

Now, description will be given on pulverizing operation of coal at the vertical mill 1.

Under a condition that the pulverizing table 5 is rotated and the primary air is introduced via the primary air supply port 15, the coal in form of lump is sent through the chute 18. The coal in form of lump fall toward a center of the pulverizing table 5 from a lower end of the chute 18, and the coal is supplied onto the pulverizing table 5.

The coal on the pulverizing table 5 is moved in outer peripheral direction by centrifugal force. The coal is then caught by the pressure roller 9, is pulverized and is turned to powder state. Further, the coal is filled up in outer peripheral region by the centrifugal force from the table segment 7. The pulverized coal thus filled up is moved upward by the primary air, which is blown upward via the blowout hole 16.

On a peripheral region of the table segment 7, a dumb-ring 24 or an inner edge 26a is disposed in order to hold the coal on the table segment 7 for a required time period and to increase a pulverizing efficiency, and a coal layer with a thickness as required is formed on an upper surface of the table segment 7.

When the wooden biomass such as wooden chips, wooden pellets, etc. (hereinafter referred as "wooden biomass") is supplied to the vertical mill 1 or to a mill with an equivalent structure and is pulverized, it is found that the biomass exhibits behavior different from behavior of the coal described as follows, and that the pulverizing efficiency cannot be attained sufficiently.

Because the coal has no caking property and has high specific gravity, when the coal is pulverized, the coal is moved smoothly by the centrifugal force caused by the rotation of the pulverizing table 5, and the pulverizing efficiency as desired can be attained. Similarly, sufficient pulverizing efficiency can be accomplished when a mixing ratio of the wooden biomass is 5% or less.

However, when the mixing ratio of the wooden biomass is increased or when the wooden biomass is pulverized by itself, the wooden biomass moves less smoothly on the table compared with a case of the coal because the wooden biomass is light in weight and is made of fibers. Therefore, a frequency of an engagement of the wooden biomass with the pressure roller 9 is low, and the pulverizing operation is not carried out effectively.

Further, when the wooden biomass is not moved smoothly toward outer periphery of the pulverizing table 5, the powder after pulverizing is not efficiently discharged out of the mill and the powder after pulverizing is stagnated in the mill. This causes an increase of differential pressure within the mill and an increase of the power of the table drive unit 4. Thereby, pulverizing capacity will be limited.

SUMMARY OF THE INVENTION

It is an object of the present invention to provide a biomass mill, by which it is possible to ensure smooth moving of a wooden biomass on a pulverizing table, to promote discharge of powder from the mill and to increase a pulverizing capacity.

To attain the above object, the present invention provides a biomass mill, comprising a rotatable pulverizing table, a recessed groove which is provided in form of ring on an upper surface of the pulverizing table and has an arcuate cross-section, a pressure roller pressed into the recessed groove, a blowout hole for blowing out the air from around the pulverizing table, and a chute for supplying a wooden biomass toward a center of the pulverizing table, wherein the wooden biomass is supplied via the chute, the wooden biomass is pulverized between the pulverizing table and the pressure roller, and the pulverized wooden biomass is carried by blowing the air through the blowout hole, wherein a surface from an outer peripheral of the recessed groove to the blowout hole is flat surface.

Also, the present invention provides the biomass mill as described above, wherein at least an outer peripheral groove width angle of the recessed groove is set from 0° to 35°, and also provides the biomass mill as described above, wherein the outer peripheral groove width angle of the recessed groove is set to a value smaller than the inner peripheral groove width angle.

The present invention provides a biomass mill, comprising a rotatable pulverizing table, a recessed groove which is provided in form of ring on an upper surface of the pulverizing table and has an arcuate cross-section, a pressure roller pressed into the recessed groove, a blowout hole for blowing out the air from around the pulverizing table, and a chute for supplying a wooden biomass toward a center of the pulverizing table, wherein the wooden biomass is supplied via the chute, the wooden biomass is pulverized between the pulverizing table and the pressure roller, and the pulverized wooden biomass is carried by blowing the air through the blowout hole, wherein a surface from an outer peripheral of the recessed groove to the blowout hole is flat surface. As a result, the wooden biomass is easily moved in outer peripheral direction, and the pulverizing capacity can be increased. Because the outer peripheral groove width angle of the recessed groove is designed smaller than the inner peripheral groove width angle, the wooden biomass is moved in outer peripheral direction more easily, and this contributes to the increase of the pulverizing capacity.

BRIEF DESCRIPTION OF THE DRAWINGS

FIG. 3 a table to show a comparison between a case where a wooden biomass is pulverized by itself according to the present invention and a case where the wooden biomass is pulverized by itself in an example of the prior art.

DETAILED DESCRIPTION OF THE PREFERRED EMBODIMENT

Figure 1:
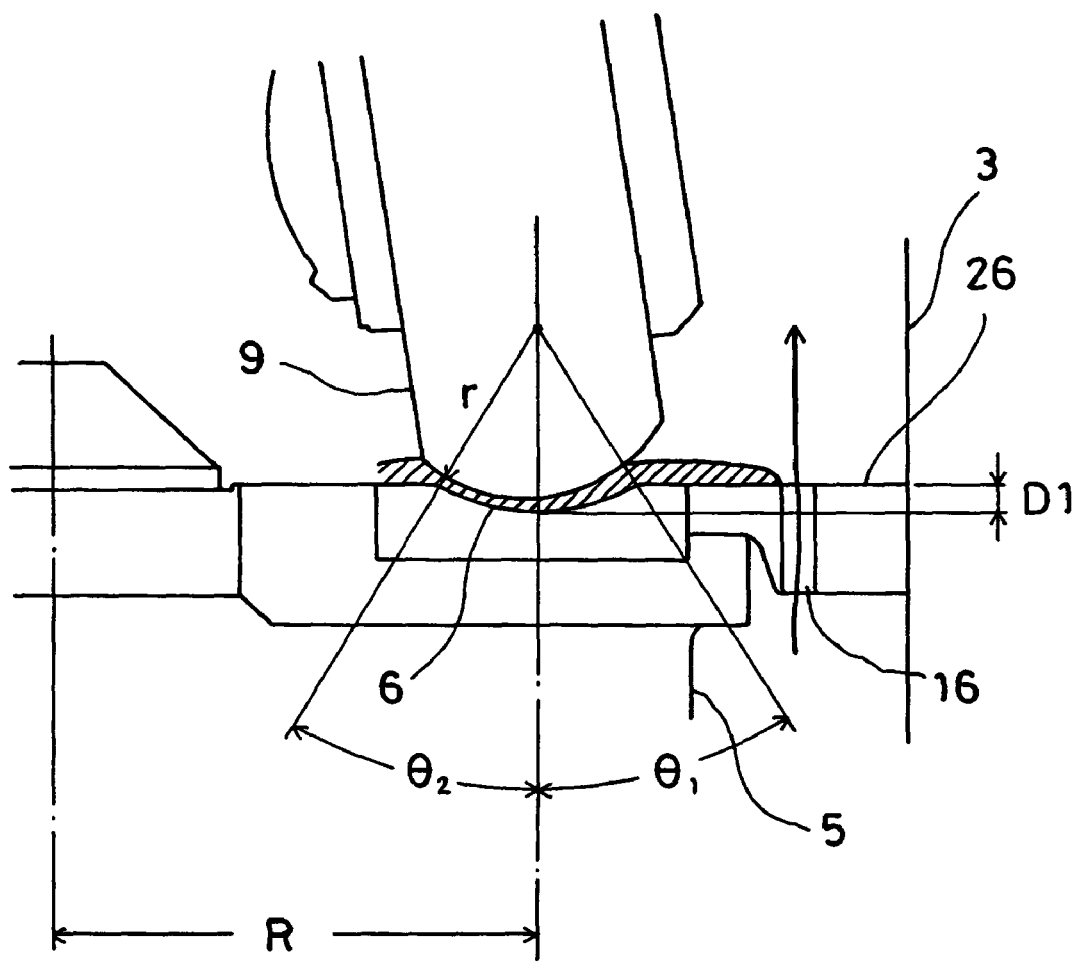
FIG. 1 is an illustrative drawing to show an essential portion of an embodiment of the present invention.

Description will be given below on the best aspect for carrying out the present invention by referring to the attached drawings.

First, in order to explain the present embodiment more accurately, description will be given on a relation between a conventional type table segment 7 and a pressure roller 9 by referring to FIG. 2.

An air port ring 26 is disposed on outer periphery of the table segment 7. A blowout hole 16 is formed on the air port ring 26 at a predetermined distance so that a primary air is blown upward via the blowout hole 16. An inner edge 26a of the air port ring 26 is designed so that an inner edge 26a of the air port ring 26 is tapered and inclined downward toward a center, and the inner edge 26a is inclined in approximately similar manner to a tangential line on an outer edge end of a recessed groove 6. The inner edge 26a is designed in such manner that a pulverized coal can be moved smoothly from the recessed groove 6 to the inner edge 26a.

On an upper surface and on inner periphery of the air port ring 26, a dumb-ring 24 and the inner edge 26a are provided.

The dumb-ring 24 is positioned between the outer peripheral edge of the inner edge 26a and the blowout hole 16. An inner peripheral surface of the dumb-ring 24 runs in vertical direction, and is a surface bent discontinuously with the inner edge 26a.

Figure 2:
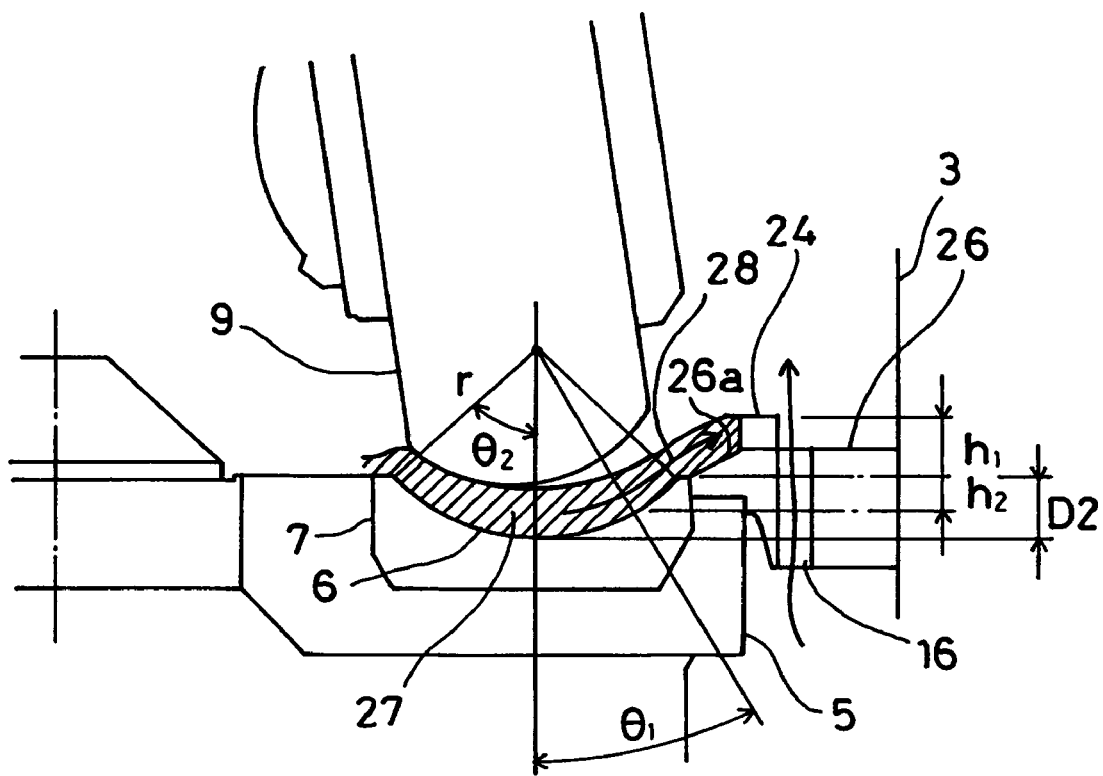
FIG. 2 is an illustrative drawing to show an essential portion of an example in the prior art.
Figure 4:
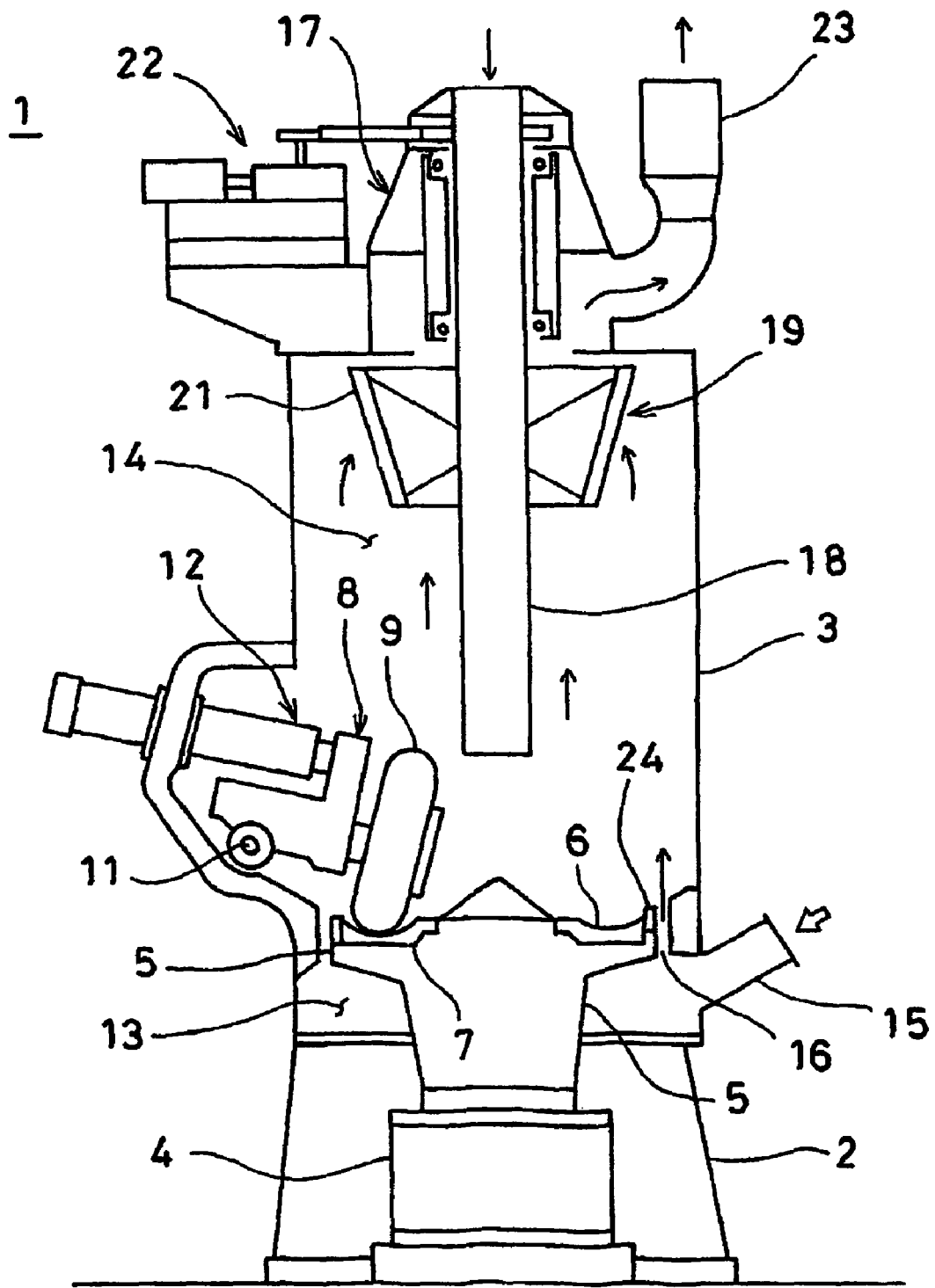
FIG. 4 is a schematical drawing of a vertical mill.

In FIG. 2, reference numeral 27 denotes a layer of the pulverized coal where the coal is pulverized, and an arrow mark 28 indicates a flow of the pulverized coal layer 27.

The dumb-ring 24 is disposed on a periphery of the table segment 7 so that the flow of the pulverized coal layer 27 is blocked and a thickness of the pulverized coal layer 27 is maintained. After passing beyond the dumb-ring 24 or the inner edge 26a, the pulverized coal is blown upward by the primary air blown via the blowout hole 16.

As described above, the coal has no caking property and has high specific gravity. Thus, the pulverized coal layer 27 is moved smoothly by the centrifugal force caused by the rotation of the pulverizing table 5. In this respect, in order to maintain the time to apply pressure by the pressure roller 9 and to attain the pulverizing efficiency as desired, the dumb-ring 24 or the inner edge 26a is needed, which can suppress the flow of the pulverized coal layer 27.

In contrast, the wooden biomass is made of light-weight fibers and the wooden biomass moves on the table not very smoothly compared with the coal. Accordingly, when the dumb-ring 24 or the inner edge 26a is disposed, the movement of the pulverizing table 5 is hindered more.

Therefore, in case of the wooden biomass, the frequency of the engagement with the pressure roller 9 is low, and the pulverizing is not carried out effectively. After the pulverizing, the powder (hereinafter referred as "biomass powder") is not easily discharged out of the mill. As a result, the pulverizing capacity is limited because of the increase of differential pressure within the mill and the increase of moving power of the table drive unit 4.

If a combustion is taken into account in case of the coal, it is necessary to pulverize the coal so that an average particle diameter of the pulverized coal will be about 40 μm. In case of the wooden biomass, a quantity of volatile components is large and the combustion proceeds fairly well. Accordingly, pulverizing may be carried out to have the maximum particle size of less than 1 mm.

In the present embodiment, special consideration is given on the movement of the biomass powder and on the particle diameter of the biomass powder.

Now, referring to FIG. 1, description will be given on the present embodiment by comparing with the example in the prior art as shown in FIG. 2.

In the example of the prior art, when the dumb-ring 24 is disposed, the recessed groove 6 is designed symmetrically to a line, which runs perpendicularly to the center of the groove (left-to-right symmetry in the figure). Here, it is supposed that a radius of curvature of the recessed groove 6 is set to "r" and angle of groove width (i.e. an angle from the centerline to a groove edge; hereinafter referred as "groove width angle") is θ2. Then, depth D2 of the recessed groove 6 is given as: (r−r cos θ2). To calculate the depth from a deepest position of the recessed groove 6 to an upper surface of the dumb-ring 24, a height of the inner edge 26a and a height of the dumb-ring 24 must be added. In the prior art, the groove width angle θ2 is 40° or more.

In the present embodiment, the dumb-ring 24 and the inner edge 26a are not used. A portion from outer peripheral edge of the recessed groove 6 to the blowout hole 16 is designed as a horizontal flat surface. Further, a groove width angle on inner peripheral side from the center of the groove (hereinafter referred as "inner peripheral groove width angle θ2") and a groove width angle on outer peripheral side (hereinafter referred as "outer peripheral groove width angle $\theta 1$") are set up separately. Then, the inner peripheral groove width angle $\theta 2$ is set so as to be equal to the outer peripheral groove width angle $\theta 1$ ($\theta 1=\theta 2$), or the outer peripheral groove width angle $\theta 1$ is set to a value smaller than the inner peripheral groove width angle $\theta 2$ ($\theta 1<\theta 2$).

Also, it is set as: $\theta 2=45°$ to $30°$, and
$\theta 1=35°$ to $0°$.

The flat surface may be horizontal or may be inclined upward to outside or may be inclined downward with respect to a horizontal plane. To design the flat surface horizontally or with ascending inclination or descending inclination, it is determined according to the pulverized condition of the wooden biomass or to the moving condition in radial direction.

A depth D1 on outer peripheral side of the recessed groove 6 in the present embodiment is: $(r-r\cos\theta 1)$ (<D2). Compared with the prior art, the depth of the groove is shallower by an extent of h2. Further, the depth of the groove is shallower by an extent of h1, i.e. shallower by the height of the inner edge 26a and the height of the dumb-ring 24.

Therefore, according to the present embodiment, the depth of the groove on outer peripheral side is shallower by (h1+h2) than the prior art. As a result, the biomass powder is more easily moved toward outer peripheral side of the pulverizing table 5. Further, because the dumb-ring 24 is not used, a stagnation of the biomass powder in the recessed groove 6 can be eliminated, and the biomass powder moves more quickly toward outer peripheral side.

In case where the outer peripheral groove angle $\theta 1=0$, the depth of the groove on outer peripheral side is 0, and the groove will be shallower by an extent of "h1+D2".

Then, the width of the recessed groove 6 is "$2r\sin\theta 2$" in the prior art, while it is "$r\sin\theta 1+r\sin\theta 2$" (where $\theta 1<\theta 2$; $r\sin\theta 1<r\sin\theta 2$). Thus, the region where pressure is applied by the pressure roller 9 will be smaller, and the pulverized particle diameter will be larger than the pulverized particle diameter in the past.

In the present embodiment, if the maximum particle diameter of the biomass powder is set to about 1 mm, and further, the dumb-ring 24 and the inner edge 26a are not used, and also, if the depth and the width of the recessed groove 6 are decreased, the pulverizing capacity can be extensively increased.

Next, description will be given below on a more concrete example. In the example given below, the inner peripheral groove width angle $\theta 2$ is set to be equal to the outer peripheral groove width angle $\theta 1$ ($\theta 1=\theta 2$).

The turning radius (radium of gyration) R at the center of the recessed groove 6 is set to 675 mm, and the radius of curvature "r" of the recessed groove 6 is set to 189 mm. Then, according to the present embodiment, the outer peripheral groove width angle is set to: $\theta 1=31°$, and the depth of the groove on outer peripheral side is: D=27 mm when the outer peripheral groove width angle $\theta 1=31°$. When this is compared with the example in the prior art where the groove width angle $\theta 1=40°$ and where the dumb-ring 24 and the inner edge 26a are provided, the depth in the present embodiment will be shallower by 38 mm compared with the example in the prior art.

FIG. 3 shows the results of comparison between a case where a conventional type coal mill is used as a biomass mill and the wooden chips and the wooden pellets are pulverized by themselves and a case where the wooden chips and the wooden pellets are pulverized by a biomass mill according to the present embodiment.

As shown in FIG. 3, when mill motor power (driving force) is approximately the same, a supply quantity is increased from 200 kg/h to 300 kg/h in case of the wooden chips, and from 400 kg/h to 500 kg/h in case of the wooden pellets. As a result, better effects by the present embodiment can be confirmed.

The biomass powder can be moved toward the outer peripheral side easier by simply making the outer peripheral groove width angle $\theta 1$ be smaller than the inner peripheral groove width angle $\theta 2$. Further, if it is supposed that the outer peripheral groove width angle $\theta 1=0°$ or $\approx 0$, i.e. the groove width on the outer peripheral side is supposed to be 0 or to be approximately 0, the moving of the biomass powder toward the outer periphery side can be more positively promoted. Therefore, by selecting the outer peripheral groove width angle $\theta 1$ in the range of $\theta 1=35°$ to $0°$ and/or by selecting tilt angle of the flat surface, it is possible to accomplish the pulverizing operation of the biomass powder in optimal condition.

The invention claimed is:

1. A biomass mill, comprising a rotatable pulverizing table, a recessed groove which is provided in form of ring on an upper surface of said pulverizing table and has an arcuate cross-section, a pressure roller pressed into said recessed groove, a blowout hole for blowing out the air from around said pulverizing table, and a chute for supplying a wooden biomass toward a center of said pulverizing table, wherein the wooden biomass is supplied via said chute, the wooden biomass is pulverized between said pulverizing table and said pressure roller, and the pulverized wooden biomass is carried by blowing the air through the blowout hole, wherein an outer peripheral groove width angle of said recessed groove is set to a value smaller than an inner peripheral groove width angle, and wherein a surface from an outer peripheral of said recessed groove to said blowout hole is a flat surface.

2. A biomass mill according to claim 1, wherein at least an outer peripheral groove width angle of said recessed groove is set from $0°$ to $35°$.

3. A biomass mill according to claim 1, wherein the outer peripheral groove width angle is set to $0°$.

4. A biomass mill according to claim 1, wherein a height of said flat surface is set to be lower than a height of an inner peripheral edge of said recessed groove.

5. A biomass mill according to claim 1, wherein said flat surface is inclined downward to outside with respect to a horizontal plane.

6. A biomass mill according to claim 1, wherein said outer peripheral groove width angle and/or a tilt angle of said flat surface is selected according to property and characteristics of the biomass.

7. A biomass mill according to claim 1, wherein the maximum particle diameter of the biomass powder pulverized is approximately 1 mm.

* * * * *